G. TUMARELLO.
COFFEE POT.
APPLICATION FILED AUG. 11, 1920.
1,381,678.
Patented June 14, 1921.
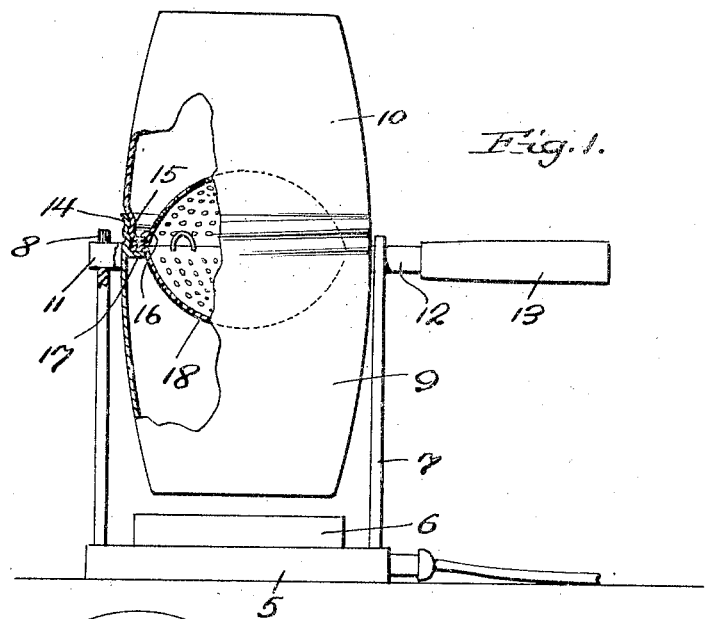
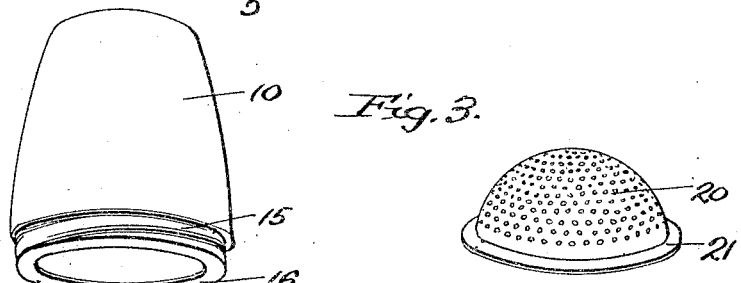
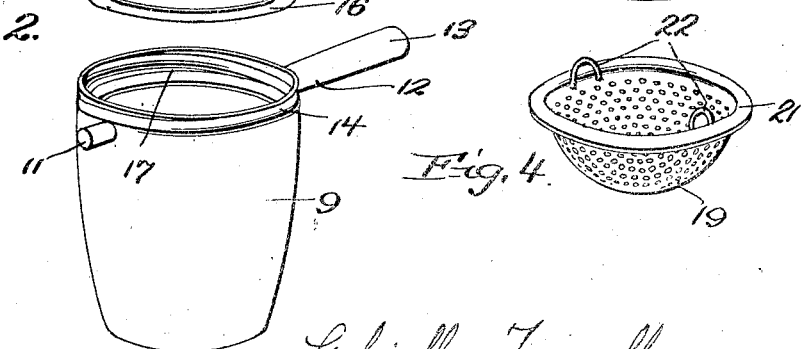
Gabriella Tumarello, INVENTOR.
BY
ATTORNEY.

UNITED STATES PATENT OFFICE.

GABRIELLA TUMARELLO, OF BENLD, ILLINOIS.

COFFEE-POT.

1,381,678.   Specification of Letters Patent.   Patented June 14, 1921.

Application filed August 11, 1920. Serial No. 402,771.

*To all whom it may concern:*

Be it known that I, GABRIELLA TUMARELLO, a citizen of the United States, residing at Benld, in the county of Macoupin and State of Illinois, have invented certain new and useful Improvements in Coffee-Pots, of which the following is a specification.

My invention relates to improvements in coffee pots.

An important object of the invention is to provide a device of the above mentioned character, which is reversible, so that the hot water may be passed a number of times through the perforated coffee holding element, depending upon the desired strength of the coffee.

A further object of the invention is to provide a device of the above mentioned character, formed of few and simple parts.

Other objects and advantages of the invention will be apparent during the course of the following description.

In the accompanying drawings forming a part of this specification, and in which like numerals are employed to designate like parts throughout the same, Figure 1 is a side elevation of a coffee pot embodying my invention, parts broken away and parts in section, Fig. 2 is a perspective view of the pot sections, Fig. 3 is a perspective view of a strainer section, and, Fig. 4 is a similar view of a coacting strainer section.

In the drawings, the numeral 5 designates a base, carrying an electric heater or burner 6. Secured to the base 5 are vertical standards 7, the upper ends of which are forked forming openings 8.

The numerals 9 and 10 designate coacting pot-sections. The pot section 9 carries trunnions 11 and 12, which are rotatable within the openings 8 and may be readily removed therefrom. The trunnion 12 carries a handle 13. The open end of the pot-section 9 is internally threaded, as shown at 14 for receiving exterior threads 15 upon the pot-section 10. The pot-section 10 is provided at its threaded end with an inwardly projecting annular flange 16. The pot-section 9 is provided with a coacting inwardly extending annular flange 17, placed a substantial distance from the open end of the same.

The numeral 18 designates a strainer element as a whole, for the reception of the coffee, powdered or granular, and this strainer element embodies perforated strainer-sections 19 and 20, which are spherically curved, and provided with outwardly extending annular flanges 21. These annular flanges are adapted to be arranged in close superposed relation, between the flanges 16 and 17, which clamp them in place. The strainer-section 19 may be equipped with handles 22.

In use, the pot-section 9 may be supported vertically and the desired amount of water added thereto. The strainer-element 18 may be properly filled with the coffee, with its flanges 21 engaging upon the flange 17. The pot-section 10 is now screwed upon the pot-section 9. When the heater or burner 6 is started the water will be heated within the lower pot-section, and by inverting the pot by turning the same upon its trunnions 11 and 12, the water may be passed through the strainer element. By removing the upper pot-section and strainer element the coffee may be poured from the lower pot-section.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, I claim:—

1. In a device of the character described, a support having openings, a pot-section provided with trunnions pivotally supported within said openings, said pot-section being provided at its open end with screw-threads, and having an inwardly projecting annular flange arranged interiorly thereof near said screw-threads, a coacting pot-section having its open end provided with screw-threads to engage the screw-threaded end of the first named pot-section and provided near such screw-threads with an inwardly extending annular flange, a strainer element embodying a pair of strainer-sections having annular flanges adapted to be assembled in close superposed relation between the first named flanges and to be clamped therebetween, means to heat either pot-section, and a handle carried by one trunnion.

2. A device of the character described comprising a support having openings, a pot-section carrying outwardly extending pivot means to engage within said openings, said pot-section being provided at its open end with interior screw-threads and an interior annular flange near the base of the screw-threads, a coacting pot-section having exterior screw-threads to engage within the screw-threaded end of the other pot-section and provided at its open end with an interior annular flange, and a strainer element embodying a pair of strainer-sections having annular flanges, said annular flanges being adapted to be confined between the annular flanges of the pot-sections.

In testimony whereof, I have affixed my signature in the presence of two witnesses.

GABRIELLA TUMARELLO.

Witnesses:
JOHN PEZZETTI,
ANTON BERTOGLIO.